Oct. 15, 1957 — M. G. DRUCK — 2,809,649
PLASTIC SHELTER
Filed May 3, 1955

INVENTOR.
Milton G. Druck
BY
Atty.

United States Patent Office 2,809,649
Patented Oct. 15, 1957

2,809,649

PLASTIC SHELTER

Milton G. Druck, Portland, Oreg., assignor to Plastimayd Products Corporation, Portland, Oreg., a corporation of Oregon Application May 3, 1955, Serial No. 505,743

1 Claim. (Cl. 135—8)

This invention relates to plastic shelters and more particularly to shelters or tents of the type employed in connection with utility maintenance work.

The construction and maintenance of exterior cables and other equipment by telephone, electric light and other utility companies is a continuing job which must be carried on day and night and in all types of weather. In the case of repair work this very often must be done under particularly adverse weather conditions. In order satisfactorily to perform the work the repairmen, as well as the equipment, must be protected from the elements. Heretofore various devices made from canvas have been widely used in an effort to provide protection, but there have been many drawbacks in the construction of these devices, plus the fact that they were heavy and difficult to erect particularly when employed for aerial purposes. Further, they were not completely waterproof. However, they were light proof which was a serious disadvantage in that either they had to be left open to let daylight in or else an auxiliary source of light was required and in cold weather a portable stove or the like was necessary. Additionally, these devices were subject to deterioration from rot, mildew, acids, oils, and gasoline, all of which factors and elements are commonly associated with repair work. The shelter devices heretofore used were therefore barely adequate and there has been a continuing need for many years for something superior.

Tents according to the invention have satisfied this need and solved the long standing problem of this type of shelter by permitting outside light to come into the tent while maintaining it weatherproof at all times. According to the invention, sheets of translucent vinyl material are electronically bonded to one another into the shape of a tent. The tent may be readily and securely mounted on a simple supporting frame. Efficient and secure means for opening and closing parts of the tent are provided and in the case of aerial tents, provision is made for permitting the tent to be mounted in cooperative relation with the wires and cables extending between the supporting utility poles.

Some of the desirable features, heretofore unavailable, of tents according to the invention, are that they are translucent and permit the introduction and diffusion of light within the tent making it possible to work in daylight without the necessity of an additional source of light or of having to leave the tent open to the elements. When the tents are used at night, any light which is used inside the tent shines through as a safety precaution, clearly marking its position. This is an important feature particularly when the tents are employed as street manhole covers. The necessity for an auxiliary source of heat, such as a portable stove, when the tent is employed during cold weather has been eliminated because the tent according to the invention has high heat retention qualities and the heat generated by body warmth is usually sufficient. The tents are permanently waterproof, requiring no maintenance and are sufficiently light for one man to install himself. The lightweight feature is important in the installation of aerial tents where they have to be carried up and down a ladder and mounted on an overhead cable. Tents according to the invention are fire resistant and impervious to deterioration from acid, oils, gasoline, rot and mildew and, if desired, may be easily cleaned by soap and water. They may be made from sheeting which is formulated to withstand low temperatures, i. e. about −20° F., so that when subjected to wide variations of temperature they will not freeze, crack, or otherwise change their characteristics. The electrical characteristics of the tents are also important in view of their particular use in connection with electrical installations. They have a high dielectric strength up to 16,000 volts (for .020 material) depending upon the thickness of the material used and an insulation resistance of $1.4 \times 10^6$ per cubic centimeter.

Figures 1, 2, 3, 4:
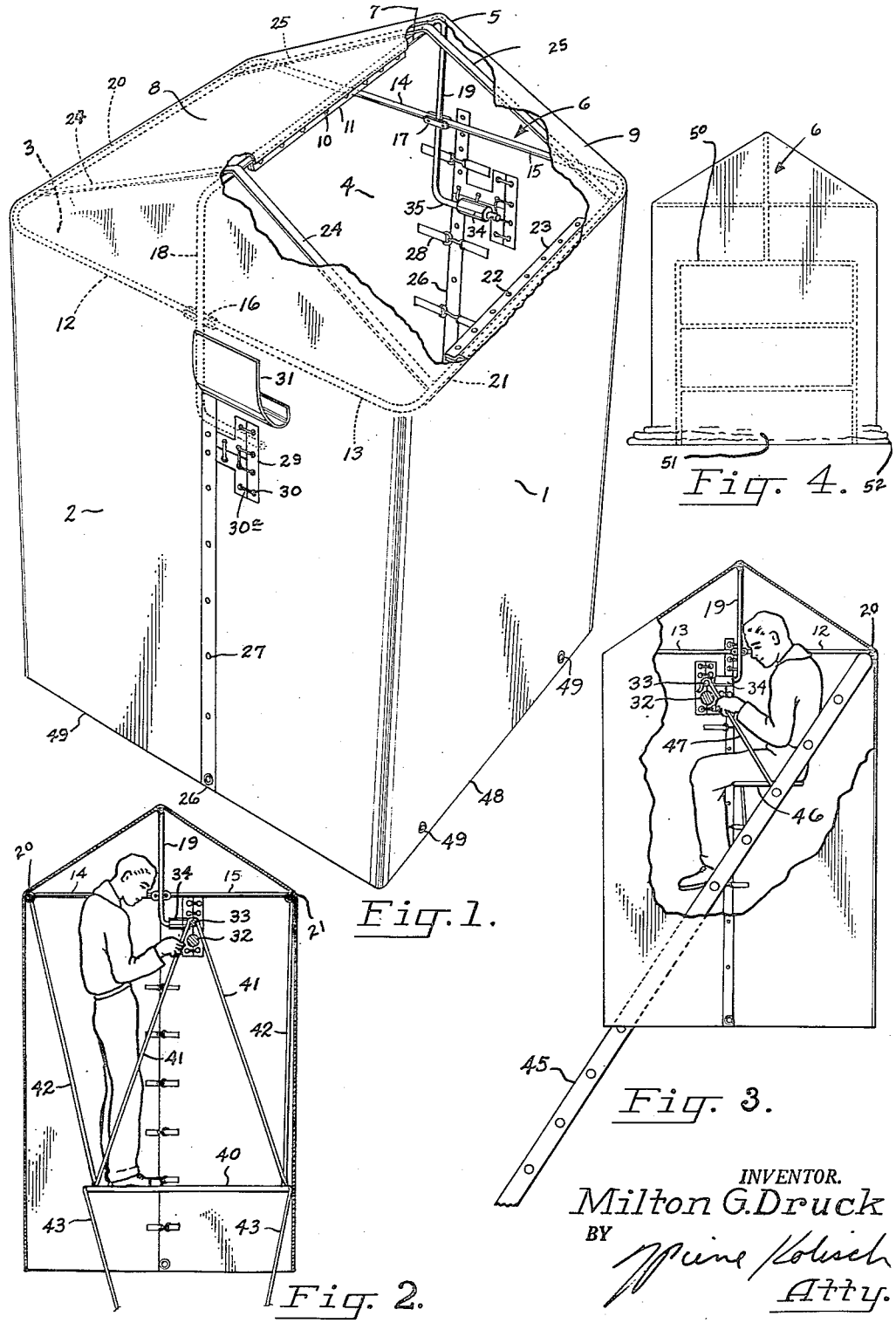
Fig. 1 is a perspective view of the tent partially broken away to show the inside construction.
Fig. 2 is a cross section of an aerial tent when used in conjunction with a platform.
Fig. 3 is a side elevation of an aerial tent partially broken away showing the tent when used in conjunction with a ladder seat.
Fig. 4 is a side elevation of a tent used as a manhole cover.

The tent is made up from sheets of translucent vinyl, preferably of a low temperature type so that it may successfully withstand large variations in temperature, and has four side sections 1, 2, 3 and 4 and a top portion generally indicated at 5. The bottom of the tent is open. It is supported by means of a frame 6 preferably made from tubular metal. The frame comprises a ridge pole 7 which longitudinally engages the center of the top of the tent to divide it into portions 8 and 9. The top is secured to a pole 7 by means of snap fasteners 10 provided in depending portions of material 11 which encompasses pole 7. Arms 12, 13, 14 and 15 of the frame are pivotally connected at 16 and 17 from which points vertical arms 18 and 19 project. Arms 12 and 14 are connected by horizontal arm 20 and arms 13 and 15 by horizontal arm 21. Snap fasteners 22 provided in extensions 23 from the material encompass arms 20 and 21 and hold the sides of the tent to the frame. Straps 24, 25, preferably of plastic, extend between ridge pole 7 and arms 20 and 21 and serve to support top portions 8 and 9 and maintain the arms in position.

Sides 2 and 4 are vertically divided into two portions by opening flaps 26 which have snap fasteners 27. Between the snap fasteners and on the inside of flaps 26 are provided hook and ring attachments 28 of the harness snap closure type which also serve to close the flaps. In really inclement weather the tent may be securely closed by employing both fastening devices. The harness snap fasteners are a ready and satisfactory manner of closing the flaps under ordinary conditions. In the case of warm weather it may be desirable to leave the sides of the tent open which may be accomplished by throwing back the flaps.

In horizontal alignment in each of sides 2 and 4, slots 29 are provided to permit passage of cables and wires through the tent. These slots may conveniently be T-shaped to accommodate different types of wires and cables. Grommets 30 are provided along the edges of the slots so that they may be tied closed by a rope 30a, preferably of extruded plastic. Plastic rope may also be employed to tie the grommeted top opening of flaps 26 to relieve the strain at this vulnerable point from opening and closing of the flaps. Flaps 31 may be provided on the outside of sides 2 and 4 for the purpose of covering slots 29 when they are not in use. Slots 29 are especially adapted to accommodate a telephone cable 32 and its accompanying messenger or supporting wire 33 (Figs. 2 and 3). Frame 6 is adapted to be supported on wire 33 by means of clamps 34 mounted on elbows 35 extending from arms 18 and 19.

Referring to Fig. 2, it will be seen that where the aerial tent is used in connection with a platform 40, the platform is supported from wire 33 by means of a sling 41. Steadying lines 42 extend between the platform and arms 20 and 21 of the frame. The platform is also anchored in position by means of ropes 43 which extend downwardly and may be fastened to the utility pole supporting the overhead wires and cables or to the ground by any suitable means.

Referring to Fig. 3, it will be seen that when the aerial tent is employed in connection with a ladder 45, the top of the ladder steadies the tent by engaging it along the line of frame arm 20. A rung seat 46 on the ladder is supported from wire 33 by hooks 47.

In connection with the tents shown in Figs. 2 and 3, it will be apparent that the workman is safely and comfortably positioned with respect to the work he must perform while being sheltered from the elements. It is unnecessary in daylight hours to provide any auxiliary source of light since the translucent vinyl plastic diffuses light throughout the inside of the tent permitting the workman to see so that he can perform his appointed task.

Referring to Fig. 4, the tent may also be used as a covering for a street manhole or the like where protection and maximum light penetration are desirable. In such cases the tent frame is fastened by clamps 34 to a suitable upstanding rigid structure such as an iron railing 50 surrounding the hole 51. Usually when the tent is used on the ground, slots 29 will not be employed and flaps 31 will be lowered to close off the slots. However, it may be desirable to fasten the bottom of the tent and an extruded plastic beading or reinforced seam 48 having grommets 49 therein is provided around the bottom edges of the sides of the tent. Beading 48 is particularly effective in preventing tears from forming in the bottom of the sides which are exposed to rough usage because they become crumpled and lie on the ground as at 52.

From the foregoing it will be appreciated that the present invention has provided the utility companies with an eminently satisfactory shelter in connection with their field work. The tent according to the invention is light, compact, easily set up yet is very durable and will withstand even the most rigorous weather. Furthermore should the plastic material of the tent ever become ripped or torn it may quickly be repaired on the spot by employing a patch of plastic material and a suitable adhesive.

I claim:

In a maintenance tent suitable for use in connection with repairs to overhead utility lines and cables and comprising sheets of low temperature translucent vinyl divided into side sections and a top, a tubular metal frame arranged to define a top and four vertical sides for supporting said sheets in the form of a tent, a pair of depending arms on said frame for engaging one of said cables, pairs of oppositely disposed arms on the frame normal to each other for engaging the sides of the tent along the points at which they join the top, a ridge member at the top of said frame for supporting the top of the tent along its center line, snap fasteners extending from said center line adapted to fasten the ridge member to the top, and snap fasteners extending from two of the opposite sides of the tent adapted to be fastened to a pair of said arms, a vertically arranged fastening flap provided in two of the opposite sides of the tent, snap fasteners provided along the outside edges of said fastening flaps at spaced intervals, snap hooks and rings provided along the inside edges of said fastening flaps in the spaces between the outside snap fasteners, the improvement comprising a T-shaped slot formed in two of the opposite sides of the tent adapted to accommodate one or more lines or cables extending longitudinally through the tent, grommets provided along marginal edges of said T-shaped slots for receiving rope means adapted to be passed through said grommets for controlling the size opening of the T-shaped slots in accordance with the diameter of the lines or cables to be passed therethrough, and a covering flap fastened along one edge above each of the T-shaped slots and adapted to cover the slots when not in use.

References Cited in the file of this patent

UNITED STATES PATENTS

| 691,964 | Olding | Jan. 28, 1902 |
| 785,571 | Raines et al. | Mar. 21, 1905 |
| 1,966,561 | Ratta | July 17, 1934 |
| 2,221,366 | Bisbing et al. | Nov. 12, 1940 |
| 2,420,898 | Miner | May 20, 1947 |
| 2,702,546 | Gilroy | Feb. 22, 1955 |
| 2,717,160 | Schmidt et al. | Sept. 6, 1955 |
| 2,723,674 | Harris | Nov. 15, 1955 |

FOREIGN PATENTS

| 532,047 | France | Jan. 8, 1895 |